(12) United States Patent
Jehle et al.

(10) Patent No.: US 9,067,590 B2
(45) Date of Patent: Jun. 30, 2015

(54) METHOD FOR OPERATING A HYBRID VEHICLE AND HYBRID VEHICLE

(75) Inventors: Martin Jehle, Lappersdorf (DE); Holger Lang, Regensburg (DE); Fernando Guillen Castillo, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 14/115,914

(22) PCT Filed: Apr. 18, 2012

(86) PCT No.: PCT/EP2012/057034
§ 371 (c)(1),
(2), (4) Date: Nov. 6, 2013

(87) PCT Pub. No.: WO2012/152550
PCT Pub. Date: Nov. 15, 2012

(65) Prior Publication Data
US 2014/0080662 A1      Mar. 20, 2014

(30) Foreign Application Priority Data

May 6, 2011   (DE) .......................... 10 2011 075 433

(51) Int. Cl.
*B60K 6/485*       (2007.10)
*B60W 20/00*      (2006.01)
(Continued)

(52) U.S. Cl.
CPC ............ *B60W 20/106* (2013.01); *Y10T 477/23* (2015.01); *B60K 6/485* (2013.01); *B60W 10/06* (2013.01); *B60W 10/08* (2013.01);
(Continued)

(58) Field of Classification Search
USPC .................. 477/3, 902, 908; 903/930, 944; 180/65.265, 65.285; 60/607–609, 597
See application file for complete search history.

(56) References Cited

U.S. PATENT DOCUMENTS

| 4,651,561 A | 3/1987 | Ueno et al. ................. 73/114.37 |
| 6,338,391 B1 | 1/2002 | Severinsky et al. ........ 180/65.23 |

(Continued)

FOREIGN PATENT DOCUMENTS

| DE | 102005047940 A1 | 4/2007 | ............ B60W 10/06 |
| DE | 102006039399 A1 | 5/2008 | ............... B60K 6/20 |

(Continued)

OTHER PUBLICATIONS

Jentges M. et al., "Optimierte Ansteuerung Eines Downsizing-Konzepts mit Elektrischen Boost," MTZ Motortechnische Zeitschrift, Band 67, Nr. 4, 10 pages (German language w/ English abstract), Apr. 2006.

(Continued)

*Primary Examiner* — Justin Holmes
(74) *Attorney, Agent, or Firm* — Slayden Grubert Beard PLLC

(57) ABSTRACT

A method for operating a hybrid vehicle and a hybrid vehicle are disclosed. The hybrid vehicle includes a supercharged internal combustion engine having an overboost function and at least one electric drive. An overboost phase of the supercharger of the internal combustion engine is followed by a regeneration phase of the supercharger and a corresponding drop in torque, wherein the at least one electric drive is used to at least partially compensate for the drop in torque of the internal combustion engine during the overboost regeneration phase of the supercharger. Thus, an improved driving behavior with an extended overboost phase can be achieved.

12 Claims, 2 Drawing Sheets

(51) Int. Cl.
  *B60W 10/06* (2006.01)
  *B60W 10/08* (2006.01)
  *F02D 41/10* (2006.01)
  *F02D 41/00* (2006.01)

(52) U.S. Cl.
  CPC ........ *B60W 20/00* (2013.01); *B60W 2540/103* (2013.01); *B60W 2710/0666* (2013.01); *B60W 2710/083* (2013.01); *B60W 2710/1027* (2013.01); *Y02T 10/6286* (2013.01); *Y02T 10/144* (2013.01); *F02D 41/10* (2013.01); *F02D 41/0007* (2013.01); *Y02T 10/6226* (2013.01); *B60Y 2400/435* (2013.01); *Y10S 903/93* (2013.01)

(56) References Cited

U.S. PATENT DOCUMENTS

| | | | | |
|---|---|---|---|---|
| 7,174,714 B2* | 2/2007 | Algrain | ........................ | 60/608 |
| 7,640,744 B2* | 1/2010 | Rollinger et al. | ............ | 60/605.1 |
| 8,136,615 B2 | 3/2012 | Pels et al. | .................. | 180/65.28 |
| 8,143,732 B2* | 3/2012 | Algrain | ...................... | 290/1 A |
| 8,250,864 B2* | 8/2012 | Pott et al. | ........................ | 60/601 |
| 8,818,578 B2* | 8/2014 | Yuda | .............................. | 701/11 |
| 2007/0162200 A1 | 7/2007 | Zillmer et al. | .................. | 701/22 |

FOREIGN PATENT DOCUMENTS

| | | | | |
|---|---|---|---|---|
| DE | 102008064536 A1 | 6/2010 | ............ | B60W 10/08 |
| DE | 102009044779 A1 | 7/2010 | ............ | B60W 20/00 |
| JP | 2004092456 A | 3/2004 | ............ | B60K 6/485 |
| WO | 2007/025319 A2 | 3/2007 | ............ | B60K 28/12 |
| WO | 2012/152550 A1 | 11/2012 | ............... | B60K 6/48 |

OTHER PUBLICATIONS

International Search Report and Written Opinion, Application No. PCT/EP2012/057034, 17 pages, Jul. 18, 2012.

\* cited by examiner

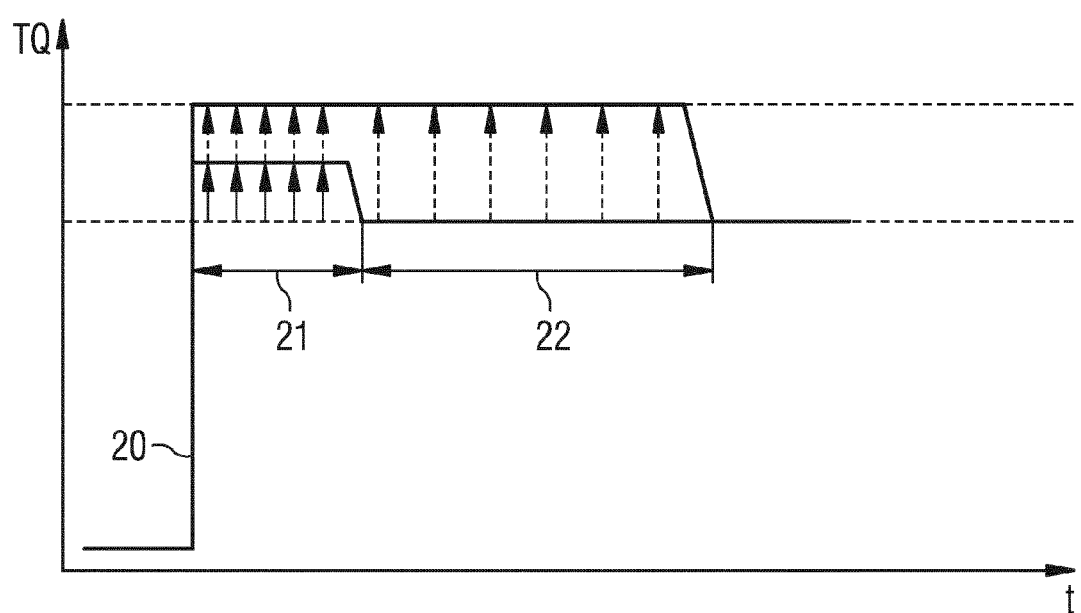

METHOD FOR OPERATING A HYBRID VEHICLE AND HYBRID VEHICLE

CROSS-REFERENCE TO RELATED APPLICATIONS

This application is a U.S. National Stage Application of International Application No. PCT/EP2012/057034 filed Apr. 18, 2012, which designates the United States of America, and claims priority to DE Application No. 10 2011 075 433.4 filed May 6, 2011, the contents of which are hereby incorporated by reference in their entirety.

TECHNICAL FIELD

The present invention relates to a method for operating a hybrid vehicle which comprises a supercharged internal combustion engine with an overboost function, and at least one electric drive, wherein after an overboost phase of the supercharger of the internal combustion engine a regeneration phase of said supercharger with a corresponding drop in torque follows.

The invention thus relates to a hybrid vehicle having a supercharged internal combustion engine with an overboost function, a supercharger for the internal combustion engine, at least one electric drive and a control unit.

BACKGROUND

In vehicles with supercharged internal combustion engines, it is possible to increase the maximum available torque over a brief time period by means of an overboost function. Such an increase in torque can be achieved in certain driving situations, for example in the case of full load or kickdown. The term "overboost" is used to refer to a function which permits the maximum engine torque to be increased for a brief time period during strong acceleration. In this context, the charged pressure is briefly increased above the normal value.

Such an overboost phase or overboost function is, however, possible only over a brief time period since otherwise overheating of the supercharger occurs. Therefore, after an overboost phase a defined regeneration time for the supercharger is necessary in order to avoid corresponding damage to the supercharger. The maximum torque made available by the overboost function is therefore available only for a brief time period.

Hybrid vehicles are known. As well as a conventional internal combustion engine, they have at least one additional electric drive so that the vehicle can be optionally driven via the internal combustion engine or the at least one electric drive and/or together by means of both driving modes. In the present case, the vehicle in question is a hybrid vehicle which has a supercharged internal combustion engine with an overboost function in addition to the at least one electric drive.

SUMMARY

One embodiment provides a method for operating a hybrid vehicle which comprises an internal combustion engine which is supercharged with a supercharger and which has an overboost function and at least one electric drive, wherein after an overboost phase of the supercharger of the internal combustion engine a regeneration phase of said supercharger follows with a corresponding drop in torque, wherein the at least one electric drive is used to at least partially compensate the drop in torque of the internal combustion engine during the overboost regeneration phase of the supercharger.

In a further embodiment, the compensation of the drop in torque is carried out in such a way that the same constant torque value occurs during the overboost phase and the subsequent regeneration phase.

In a further embodiment, the compensation of the drop in torque is carried out over a defined number of operating phases.

In a further embodiment, the number of operating phases is measured with respect to optimized battery load of the vehicle.

In a further embodiment, the end of an overboost phase is used to recharge the battery of the vehicle.

In a further embodiment, during the overboost phase of the supercharger the torque which is achieved as a result is increased by the static torque of the electric drive.

In a further embodiment, the compensation phase is carried out in such a way that the torque during the regeneration phase is held at the torque value increased by the static torque of the electric drive during the overboost phase.

Another embodiment provides a hybrid vehicle having a supercharged internal combustion engine with an overboost function, a supercharger for the internal combustion engine, at least one electric drive and a control unit, wherein said hybrid vehicle has a device which detects the end of the overboost phase of the supercharger and informs the control unit about this end, and in that the control unit is designed in such a way that it actuates the electric drive as a function thereof in such a way that said electric drive supplies the torque necessary for the at least partial compensation of the drop in torque in the regeneration phase of the supercharger following the overboost phase.

In a further embodiment, the control unit actuates the electric drive in such a way that the latter supplies such a torque value that the same constant torque value occurs during the overboost phase and the regeneration phase.

In a further embodiment, the control unit actuates the electric drive in such a way that the latter carries out the compensation of the drop in torque over a defined number of operating phases.

In a further embodiment, the control unit is embodied in such a way that it actuates the electric drive in such a way that during the overboost phase of the supercharger the torque which is achieved as a result is increased by the static torque of the electric drive.

In a further embodiment, the control unit is embodied in such a way that it actuates the electric drive in such a way that the torque during the regeneration phase is held at the torque value increased by the static torque of the electric drive during the overboost phase.

BRIEF DESCRIPTION OF THE DRAWINGS

Example embodiments of the invention are explained in detail below with reference to the drawings, in which:

FIG. 3 shows a diagram showing the torque profile as a function of time when a second example variant of the method.

DETAILED DESCRIPTION

Figure 1:
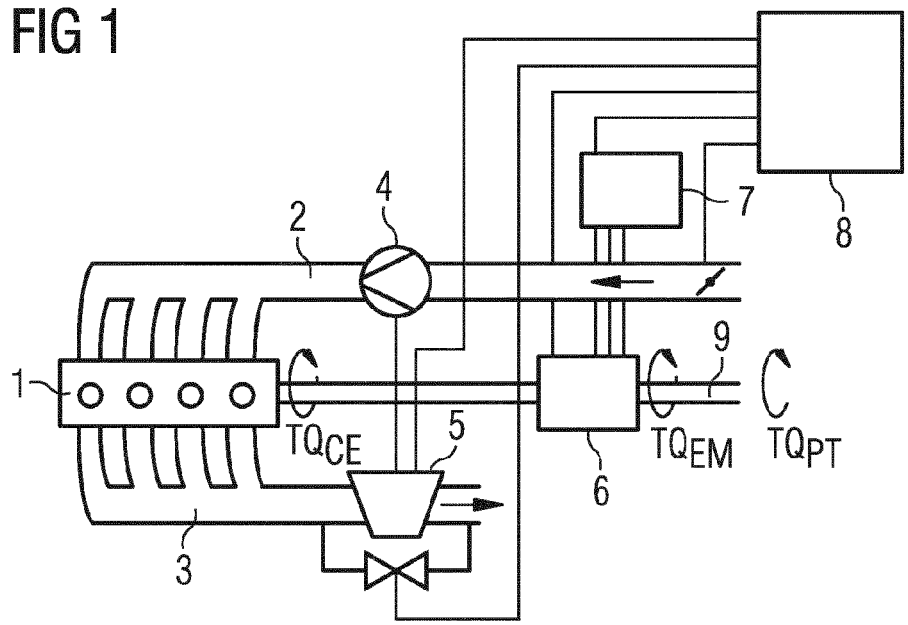
FIG. 1 shows a schematic illustration of the drive of a hybrid vehicle.

Embodiments of the provide a method of the type described at the beginning with which a particularly good driving behavior of the hybrid vehicle can be achieved.

In some embodiments, at least one electric drive is used to at least partially compensate the drop in torque of the internal combustion engine during the overboost regeneration phase of the supercharger.

With the disclosed method it is therefore possible to lengthen the overboost phase of the supercharger of the internal combustion engine while the maximum torque is made available, since during the subsequent regeneration phase a drop in torque of the internal combustion engine occurs, but said drop is at least partially compensated by the torque supplied by the at least one electric drive. The supercharger of the internal combustion engine can therefore continue to pass through a regeneration phase, as in the prior art, in order to protect said supercharger against overheating. Nevertheless, during the regeneration phase of the supercharger of the internal combustion engine a drop in torque is avoided overall, since in addition to the reduced torque of the internal combustion engine the torque which is made available by the electric drive occurs. During the actual overboost regeneration phase, the reduced torque supplied by the internal combustion engine and the torque supplied by the electric drive are therefore added, with the result that overall a high torque or the maximum torque continues to be made available from the overboost phase. The overboost phase is therefore lengthened without the supercharger being damaged in any way as a result.

In some embodiments, the overboost phase and the regeneration phase of the supercharger of the internal combustion engine are therefore preferably combined with one another without a drop in torque, with the result that an improved driving behavior with assistance by the electric drive occurs. As mentioned, the method lengthens, in particular, the overall overboost phase, and during this entire overboost phase a constant torque can be made available which leads to a constant acceleration or vehicle speed.

According to some embodiments, the compensation of the drop in torque may be performed in such a way that the same constant torque value occurs during the overboost phase and the subsequent regeneration phase. Therefore, a constant torque is made available over the lengthened overboost phase.

The compensation of the drop in torque is expediently carried out over a defined number of operating phases. This number of operating phases can be optimized with respect to available battery load of the vehicle. Therefore, a lengthened overboost function is available to the driver of the hybrid vehicle over a certain number of operating phases, depending on the state of the electric drive, i.e. the state of the battery, the battery load etc.

The end of an overboost phase can be used here to recharge the battery of the vehicle.

In a further embodiment of the method, during the overboost phase of the supercharger the torque which is achieved as a result is increased by the static torque of the electric drive. In this context, the compensation phase may be performed in such a way that the torque during the regeneration phase is held at the torque value increased by the static torque of the electric drive during the overboost phase. In this context, during the regeneration phase the electric drive can also be operated in a separate overboost mode, with the result that in this way the maximum torque of both types of drive can be utilized.

The overboost function itself can follow the maximum torque made available by both types of drive, but it can also be configured for alternating overboosting and supercharging cycles.

As mentioned at the beginning, other embodiments provide a hybrid vehicle having a supercharged internal combustion engine with an overboost function, a supercharger for the internal combustion engine, at least one electric drive and a control unit, wherein said hybrid vehicle has a device which detects the end of the overboost phase of the supercharger and informs the control unit about this end, and in that the control unit is designed in such a way that it actuates the electric drive as a function thereof in such a way that said electric drive supplies the torque necessary for the compensation of the drop in torque in the regeneration phase of the supercharger following the overboost phase.

After the detection of the end of the overboost phase of the supercharger, the electric drive is therefore switched on or activated in order to make available additional torque, and in this way to at least partially compensate the drop in torque of the internal combustion engine. The control unit is, in particular, embodied in such a way that it actuates the electric drive in such a way that the latter supplies additional torque, with the result that overall the same constant torque value occurs during the overboost phase and the subsequent regeneration phase. In this context, the value is generally the maximum permissible torque value during the overboost phase. This maximum torque value is therefore made available to the driver over a lengthened overboost phase.

The control unit may also be embodied in such a way that it actuates the electric drive in such a way that the latter carries out the compensation of the drop in torque over a defined number of operating phases. This defined number of operating phases may be optimized in accordance with the electric drive (state of battery, battery load etc.).

In addition, the control unit can be embodied in such a way that it actuates the electric drive in such a way that during the overboost phase of the supercharger the torque which is achieved as a result is increased by the static torque of the supercharger. In this variant, an increased torque, which is composed of the maximum permissible torque of the internal combustion engine and the static torque of the electric drive, is therefore already made available during the actual overboost phase.

The control unit ensures here, in particular, that this increased torque is maintained during the overboost phase and during the regeneration phase of the supercharger after the overboost phase.

FIG. 1 is a schematic view of the drive of a hybrid vehicle which has an internal combustion engine 1 and an electric drive 6 which have a common output shaft 9, as illustrated schematically. The internal combustion engine 1, which has four cylinders, applies a torque $TQ_{CE}$ to the output shaft 9. The electric drive 6 applies a torque $TQ_{EM}$ to the output shaft 9. This results therefore in an overall torque $TQ_{PT}=TQ_{CE}+TQ_{EM}$.

The internal combustion engine 1 is assigned an air inlet duct 2 in which a supercharger 4 which is driven by a turbine 5 is located. Fuel supply devices for the internal combustion engine are not illustrated. In addition, the internal combustion engine has an exhaust duct 3 in which the turbine 5 for the drive of the supercharger 4 is located. The turbine 5 is bypassed by a bypass duct in which a valve is located.

The internal combustion engine 1, the supercharger 4 with the turbine 5 and the electric drive 6 are controlled by means of a control unit 8, wherein the electric drive 6 is connected to the control unit 8 via an inverter 7. In order to carry out the disclosed method, the control unit 8 detects the end of an overboost phase of the turbocharger 4 or the start of a subsequent regeneration phase. It actuates the electric drive 6 and makes it start to operate, with the result that, in addition to the torque of the internal combustion engine which is reduced during the regeneration phase, torque from the electric drive 6 is applied to the output shaft 9, resulting in an overall torque $TQ_{PT}$ which corresponds to the torque generated by the internal combustion engine during the overboost phase. A constant torque is therefore made available during the overboost phase and the subsequent regeneration phase. In other words, the drop in torque during the regeneration phase is compensated by the torque generated by the electric drive.

The end of the regeneration phase, i.e. the lengthened overboost phase, is detected by the control unit 8, for example by means of suitable temperature monitoring of the supercharger or corresponding timing, and the electric drive 6 is switched off. A renewed overboost phrase, during which torque is only generated by the internal combustion engine, then follows. The end of this overboost phase is in turn detected by the control unit, and the electric drive 6 is then switched on for the subsequent regeneration phase. In this way, a very long overboost phase can be generated which is alternately composed of turbocharger overboost phases and turbocharger regeneration phases, combined with electric drive phases.

Figure 2:
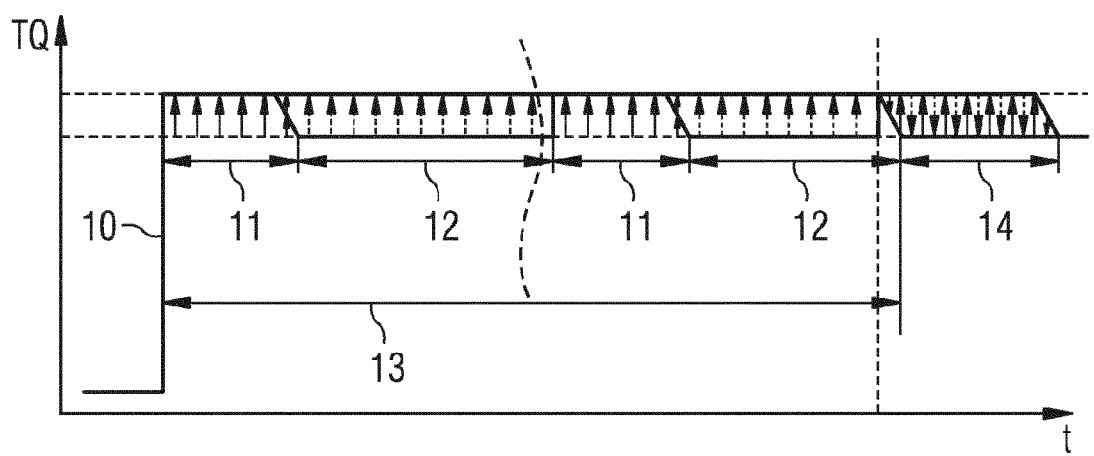
FIG. 2 shows a diagram showing the torque profile as a function of time during the execution of a first example variant of the method.

FIG. 2 shows a diagram in which the torque profile is represented as a function of time when a first variant of the disclosed method is carried out. The profile of the torque (TQ) at the coupling plotted against the time is illustrated by the unbroken line 10. An overboost phase of the supercharger is denoted by 11. The subsequent falling torque is compensated by the torque generated by the electric drive, with the result that even during the subsequent regeneration phase a torque profile which continues to be constant occurs. This phase, which corresponds to the regeneration phase of the supercharger and the torque application phase by the electric drive, is denoted by 12. Two further phases 11 and 12 then follow, with the result that overall a lengthened overboost phase 13 occurs. Subsequently, a phase 14 is illustrated which corresponds to an overboost phase of the supercharger with battery charging without additional acceleration torque as a function of the state of battery charge.

FIG. 3 shows a corresponding diagram to FIG. 2 for another variant of the disclosed method. Here, the profile of the torque TQ is illustrated as a function of time t with the unbroken line 20. However, in this variant, the static torque of the electric drive is also additionally applied to the output shaft during the overboost phase 21 of the supercharger, with the result that an increased torque already occurs during the overboost phase 21. This increased torque is then maintained during the subsequent regeneration phase 22 of the supercharger, with the result that during this method variant overall a constant increased torque occurs during the overboost phase 21 and the regeneration phase 22.

The invention claimed is:

1. A method for operating a hybrid vehicle including an internal combustion engine which is supercharged with a supercharger and which has an overboost function and at least one electric drive, the method comprising:
   after an overboost phase of the supercharger, entering an overboost regeneration phase of said supercharger which has a corresponding drop in torque,
   using the at least one electric drive to at least partially compensate for the drop in torque of the internal combustion engine during the overboost regeneration phase of the supercharger, wherein during the overboost phase of the supercharger a torque achieved during the overboost phase is increased by a static torque of the electric drive.

2. The method of claim 1, wherein the compensation for the drop in torque provides that the same constant torque value occurs during the overboost phase and the subsequent regeneration phase.

3. The method of claim 1, comprising using the end of the overboost phase to recharge a battery of the vehicle.

4. The method of claim 1, wherein the compensation for the drop in torque is performed such that the torque during the regeneration phase is held at a torque value increased by the static torque of the electric drive during the overboost phase.

5. A method for operating a hybrid vehicle including an internal combustion engine which is supercharged with supercharger and which has an overboost function and at least one electric drive, the method comprising:
   after an overboost phase of the supercharger, entering an overboost regeneration phase of said supercharger which has a corresponding drop in torque,
   using the at least one electric drive to at least partially compensate for the drope in torque of the internal combustion engine during the overboost regeneration phase of the supercharger, wherein the compensation of the drop in torque is performed over a defined number of operating phases.

6. The method of claim 5, comprising measuring the number of operating phases with respect to an optimized battery load of the vehicle.

7. A hybrid vehicle comprising:
   a supercharged internal combustion engine with an overboost function,
   a supercharger for the internal combustion engine,
   at least one electric drive,
   a control unit, and
   a device configured to:
      detect the end of an overboost phase of the supercharger, and
      inform the control unit of the detected end of the overboost phase,
   wherein the control unit is configured to actuate the electric drive as a function of detected end of the overboost phase such that said electric drive supplies a torque that at least partial compensates for a drop in torque during a regeneration phase of the supercharger following the overboost phase, wherein the control unit is configured to actuate the electric drive such that during the overboost phase of the supercharger, the torque achieved by the overboost phase is increased by static torque of the electric drive.

8. The hybrid vehicle of claim 7, wherein the control unit is configured to actuate the electric drive such that the electric drive supplies a torque value that results in the same constant torque value occurring during the overboost phase and the regeneration phase.

9. The hybrid vehicle of claim 7, wherein the control unit is configured to actuate the electric drive such that the torque during the regeneration phase is held at a torque value increased by the static torque of the electric drive during the overboost phase.

10. The hybrid vehicle of claim 7, wherein the end of the overboost phase is used to recharge a battery of the vehicle.

11. A hybrid vehicle comprising:
   a supercharged internal combustion engine with an overboost function,
   A supercharger for the internal combustion engine,
   at least one electric drive,
   a control unit, and
   a device configured to:
      detect the end of an overboost phase of the supercharger, and
      inform the control unit of the detected end of the overboost phase, wherein the control unit is configured to actuate the electric drive as a function of detected end of the overboost phase such that said electric drive supplies a torque that at least partial compensates for a drop in torque during a regeneration phase of the supercharger following the overboost phase, wherein the control unit is configured to actuate the electric drive such that the electric drive performs the compensation of the drop in torque over a defined number of operating phases.

12. The hybrid vehicle of claim 11, wherein the number of operating phases are measured with respect to an optimized battery load of the vehicle.

* * * * *